United States Patent [19]

Stanislaw

Best Available Copy

[11] E Re. 30,302

[45] Reissued Jun. 10, 1980

[54] HOT OIL DRUM

[76] Inventor: Peter Stanislaw, RD #1 9476, Stockholm, N.J. 07460

[21] Appl. No.: 951,585

[22] Filed: Oct. 16, 1978

Related U.S. Patent Documents

Reissue of:

[64] Patent No.: 3,903,961
Issued: Sep. 9, 1975
Appl. No.: 413,794
Filed: Nov. 8, 1973

[51] Int. Cl.[2] ..... F28F 13/06
[52] U.S. Cl. ..... 165/89
[58] Field of Search ..... 165/89, 90

[56] References Cited

U.S. PATENT DOCUMENTS

| | | | |
|---|---|---|---|
| 1,914,084 | 6/1933 | Ellis et al. | 165/91 |
| 2,867,414 | 1/1959 | Maloney, Jr. et al. | 165/89 |
| 2,936,158 | 5/1960 | Ramundo | 165/89 |
| 3,187,809 | 6/1955 | Spears | 165/90 |
| 3,228,462 | 1/1966 | Smith, Jr. | 34/119 |
| 3,305,742 | 2/1967 | McCune | 165/90 X |
| 3,738,423 | 6/1973 | Fleissner | 165/89 |

FOREIGN PATENT DOCUMENTS

| | | | |
|---|---|---|---|
| 1134272 | 8/1962 | Fed. Rep. of Germany | 165/90 |

*Primary Examiner*—Samuel Scott
*Assistant Examiner*—Theophil W. Streule, Jr.
*Attorney, Agent, or Firm*—Lerner, David, Littenberg & Samuel

[57] ABSTRACT

An apparatus having a substantially uniformly heated surface is provided for heat exchange purposes, such as use in the printing of textile web materials. The apparatus comprises a cylindrical, rotatable drum including narrowly spaced inner and outer concentric shells defining an annular flow space, and provided with alternating partitions and baffles extending longitudinally within that flow space, thus providing approximately U-shaped flow paths, having entrance and exit legs, for the circulation of a suitable heat-transfer medium, such as hot oil therethrough. The apparatus also includes a centrally disposed concentric tubular conduit, or central feed passage, coaxial with the cylinder or drum, for supply and return of the heat-exchange medium. Means are also provided for supplying the hot heat transfer medium from the central coaxial conduit to each entrance leg of the U-shaped flow paths within the annular flow space, and return means for return of the medium from the exit leg of each U-shaped flow path to the central coaxial conduit. Preferably, the feed means will comprise radially extending feed channels extending outwardly from said central feed passage, for supplying hot heat-transfer medium to an annular feed plenum, which is provided with radial feed distributors, each of which communicate with an entrance aperture in the entrance leg of each U-shaped flow path within the annular flow space. Also, the return means may include an annular return plenum, preferably disposed between the annular feed plenum and the concentric inner shell, the annular return plenum including return orifices communicating with exit apertures in each exit leg of the U-shaped flow paths. The return means also includes radially extending return channels communicating with the annular plenum and with the central feed passage, which is provided with a divider, or strap, in order to separate the feed means from the return means.

33 Claims, 6 Drawing Figures

HOT OIL DRUM

Matter enclosed in heavy brackets [ ] appears in the original patent but forms no part of this reissue specification; matter printed in italics indicates the additions made by reissue.

FIELD OF THE INVENTION

The present invention relates to improvements in heat-transfer apparatus, such as cylindrical, rotatable heat-transfer drums. More particularly, the present invention relates to such heat-transfer drums which are capable of maintaining substantially uniform temperatures about their entire surface. Still more particularly, the present invention relates to such heat-transfer drums employing heat transfer media, such as hot oil, for the substantially uniform heating of the cylindrical drum surface. Still more particularly, the present invention relates to such a heat-transfer apparatus of relatively simple, inexpensive construction.

BACKGROUND OF THE INVENTION

The use of cylindrical drums which employ various heat transfer media to heat their outer surfaces, and the use of these drums in various processes requiring such heat to be applied to various materials, such as textile web materials, disposed on the drum surface, is well known. Generally, these cylindrical rotatable heat-transfer drums have employed various heat-transfer media, including steam and certain hydrocarbon liquids.

For example, it has been known to supply steam to the interior of such cylindrical heat-transfer drums in order to heat the outer surface thereof. Thus, in U.S. Pat. No. 2,932,091 such a rotatable drum, used for drying purposes, is disclosed. The apparatus there taught includes a central hollow thick-walled piper for the supply of steam to radially extending distributors, and then to a large plurality of parallelly spaced tubes lying about the inner periphery of the drum itself, and then to a second set of radial angularly spaced spokes or tubes at the opposite end of said drum for return of the steam. The use of such an apparatus, however, requires various condensate headers in order to prevent obstruction of the steam passage by condensate forming within the parallelly spaced tubes, and thus disturbing the heat transfer process. It is thus also necessary to impart the steam itself through these tubes at high velocities, in order to hold down condensation, and to additionally scavenge condensate which has formed therein. The use of steam has also raised other difficulties, including problems of rust and corrosion, as well as the necessity to employ massive heavy equipment.

In an attempt to solve these problems, the use of various fluid media, such as hydrocarbons, has been suggested. Thus, U.S. Pat. 3,228,462 teaches such a heat-exchange apparatus, or cylindrical drum, which utilizes such fluids as a heat-transfer media for heating the outer cylindrical surface thereof. The patentee thus teaches concentrically disposed inner and outer shells which are separated by parallel partitions, for the supply of such a medium to the surfaces of the cylindrical drum for allegedly uniform heating thereof. The patentee also provides independent, internested, labyrinthine flow channels which extend around the periphery of the drum, and thus cause the heat transfer medium to flow in opposite directions through these channels, each such flow channel beginning at one end of the drum, and ending at the other. Thus, while the patentee attempts to place adjacent each other hotter and cooler legs in order to attempt to equalize the surface temperature of the outer shell, the apparatus taught includes all feed means for hot heat-transfer fluid at one end of the drum, and all return means for cool heat-transfer fluid at the other. In addition, use of such multi-path labyrinthine channels, even in large numbers, requires a relatively long flow path for the medium within each such flow channel, thus permitting substantial cooling of this medium during its flow therethrough. This, in turn, requires the excessive heating of the heat transfer media prior to its entrance into any given flow channel.

It is an object of the present invention to provide an improved cylindrical heat-transfer drum, which overcomes these deficiencies of the prior art drums.

It is another object of the present invention to provide such a cylindrical heat-transfer drum which enables the efficient use of a heat-transfer medium for the substantially uniform heating of the outer cylindrical surface thereof.

It is yet another object of the present invention to provide such a cylindrical heat-transfer drum which does not require the excessive pre-heating of a heat-transfer medium used to obtain substantially uniform heating of the cylindrical surface thereof.

It is yet another object of the present invention to provide such a cylindrical heat-transfer drum which achieves substantially uniform heating of the surface thereof with a fluid heat-transfer medium, and which is relatively simple and inexpensive to produce.

SUMMARY OF THE INVENTION

In accordance with the present invention an apparatus is provided for accomplishing these objectives. This apparatus, for uniformly heating various materials, such as textile web materials, generally comprises concentric inner and outer shells, thus defining an annular flow space therebetween, for the maintainance of a heat-transfer medium therein, in a manner such that substantially uniform surface heating of said outer shell is obtained, closing means at opposite ends of said apparatus for connecting the ends of said inner and outer shells, longitudinally extending partitions extending between said innder and outer shells, thus forming longitudinally extending compartments within said annular flow space, longitudinally extending baffles, also extending between said inner and outer shells, but only for a portion of the length of said longitudinally extending compartments, and alternating with said partitions, so that approximately U-shaped flow paths are formed within each longitudinally extending compartments, said flow paths including entrance and exit legs, feed means for supplying a heat-transfer medium to the entrance leg of each U-shaped flow path, and return means for withdrawing the heat transfer fluid from the exit leg of each U-shaped flow path.

In a preferred embodiment according to the present invention, the feed means supplying heat-transfer media to each U-shaped flow path includes a central, coaxial, concentric feed passage, preferably extending only partially within the drum, terminating a short distance therein, and adapted to be connected to a source of heat-transfer medium, or fluid an annular feed plenum disposed within the inner shell, radially extending feed channels connecting said central feed passage to the annular feed plenum in order to supply heat-transfer fluid from the central feed passage to the annular feed plenum, and radial feed distributors connecting the annular feed plenum to the entrance leg of each approximately U-shaped flow path, to supply heat-transfer media thereto.

Further, the return means will preferably include an annular return plenum disposed between the inner shell and the annular feed plenum, radially extending return channels connecting the annular return plenum with the central feed passage, a concentric return pipe disposed within the central feed passage to permit withdrawal of the used heat-transfer fluid from the drum, and return orifices connecting the radially extending return channels with the annular return plenum.

In addition, it is preferred that support struts be provided at opposite ends of the drum, extending between the central feed passage and the closing means. It is also within the scope of the invention, however, for the closing means to comprise transverse end walls, extending from the central feed passage to the outer shell.

In another preferred embodiment of this invention, the inner shell will include entrance ports communicating with the radial feed distributors and the entrance legs of the approximately U-shaped flow paths, and exit ports, communicating with the annular return plenum and the exit legs of the approximately U-shaped flow paths. In a highly preferred embodiment the annular return plenum will be disposed between the inner shell and the annular feed plenum, and the radial feed distributors will pass through the annular return plenum. In addition, the entrance and exit apertures will be disposed in a circular path around the surface of the inner shell, and will alternate with each other.

Further objects, additional advantages, and other novel features of the present invention will become more fully apparent from the appended claims as the insuing detailed description and discussion proceeds in conjunction with the accompanying drawings, in which:

Figure 3:
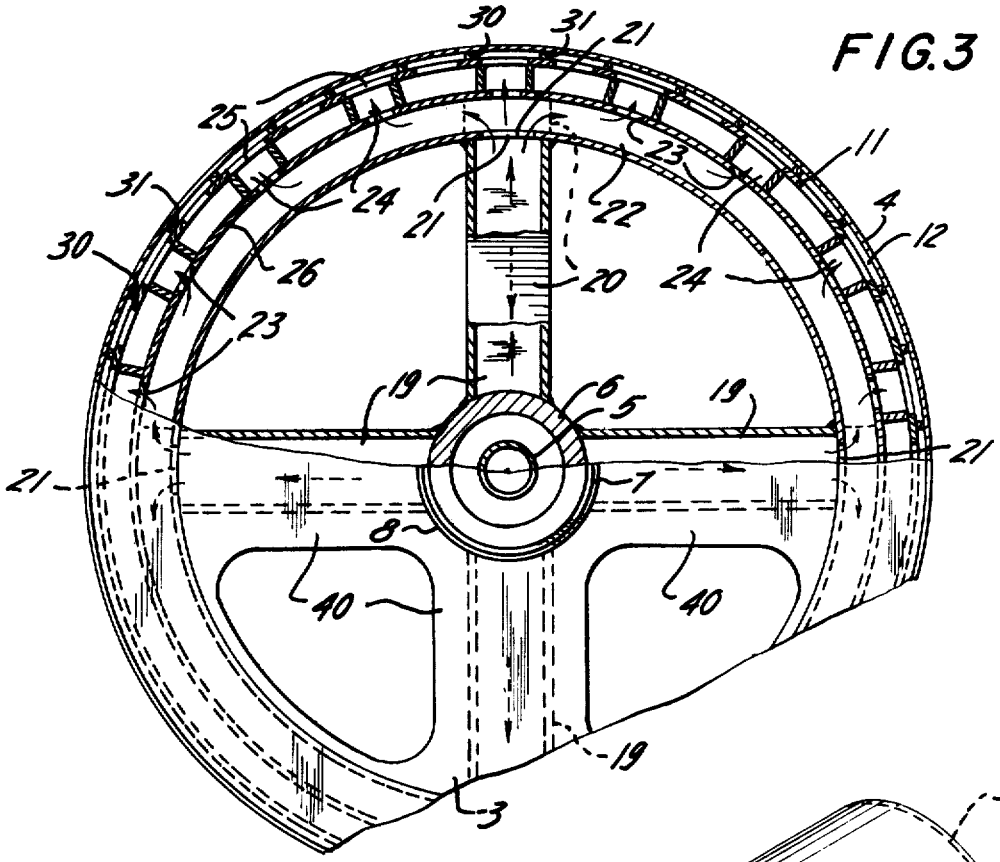
FIG. 3 is a partial sectional transverse view taken along line 3—3 of FIG. 2 showing the radial feed channels, and feed and return plenums, of this invention.
Figure 1:
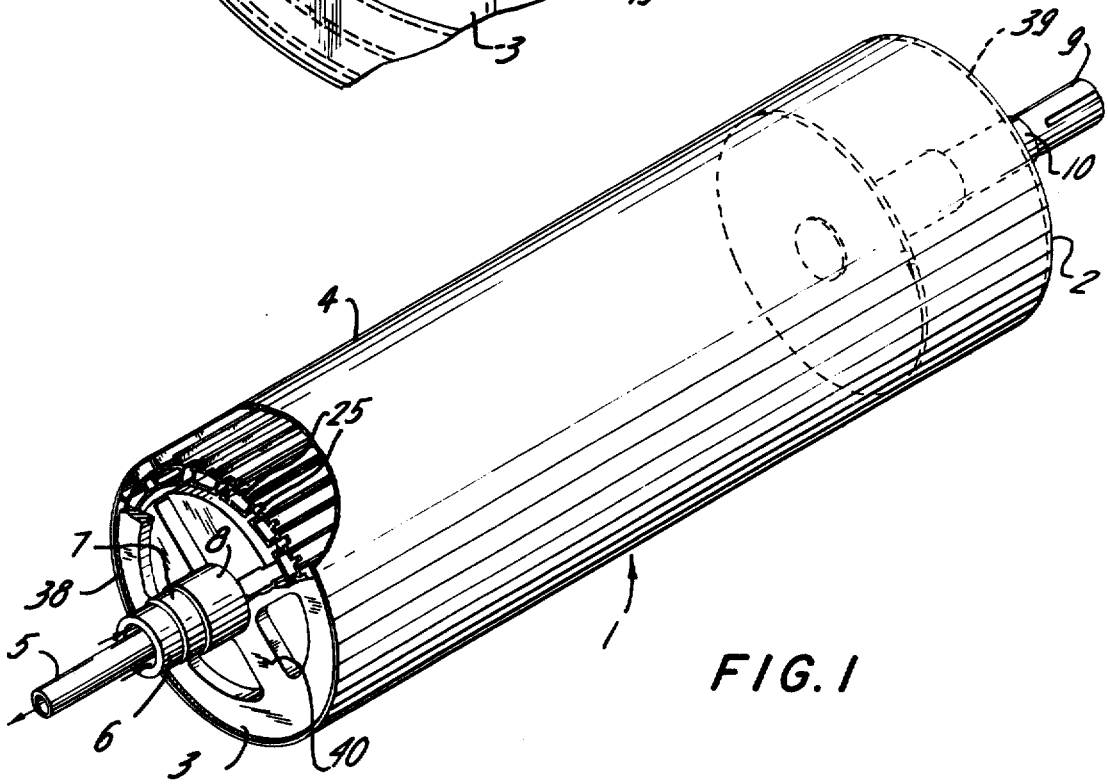
FIG. 1 is a partially torn away perspective view of the heat-transfer apparatus of the present invention.

Referring to the drawings, FIG. 1 shows a cylindrical, rotatable, heat-transfer apparatus, or drum, generally designated 1. The drum includes concentric inner and outer shells, 11 and 4, respectively, the outer shell 4 shown as partially torn away, these shells thus defining an annular flow space 12 therebetween. The construction of the outer shell 4 should be of a heat-conductive material, such as cast iron or steel. These concentric inner and outer shells terminate at two transverse faces, generally designated 2 and 3, which include annular plates, 38 and 39, connecting the ends of the inner and outer shells, to thus seal the ends of the annular flow space, 12. The face wall 3 may be designated a feed face, for its location at that end of the drum 1 through which the heat transfer medium, or hot oil, enters through a central, coaxial, concentric conduit 6. The entrance of central conduit or feed passage 6 into the drum 1 through the feed face 3 may be accomplished with concentric bearings 7 and 8. The opposite or end face, 2, which cannot be seen in FIG. 1, includes provision for the mounting of the drum, during use, including a support roller 9, mounted in a concentric bearing 10. Alternatively, in one embodiment the support roller 9 may be a concentric tubular return passage which communicates with the central feed passage 6, so that the central feed passage passes through the entire length of the drum. This embodiment may thus be employed for the supply of heat-transfer medium to one end of the drum and return at the opposite end thereof. In a preferred embodiment, however, a concentric return pipe 5, disposed within the central feed passage 6, is employed for the withdrawal of the heat-transfer medium after use. In this embodiment the central feed passage 6 extends only a short distance within the drum past the feed face 3, terminating at a bulkhead 44. Details of this embodiment are provided below.

The feed and end faces, 3 and 2, respectively, include support struts 40, which radiate, as spokes, from the central feed passage, outwardly, to the annular plates 38 and 39, thus leaving approximately triangular spaces in the end faces, between the support struts. These struts, while having other functions to be discussed below, also help to maintain the cylindrical shape of the drum, even when it is subjected to considerable external pressure. Alternatively, the entire surface of the feed and end faces, 3 and 2, may comprise solid transverse end walls, connecting the central feed passage and support roller 9, with the outer shell 4, and thus replacing, in structure and function, both the annular plates, 38 and 39, and the support struts, 40.

Within the interior of the drum, and downstream from the feed face 3, the central feed passage 6 contains radial feed openings 37, connecting the central feed passage 6 with radially extending feed channels 19. These feed channels 19 thus provide for the distribution of the heat-transfer medium outwardly from the central feed passage. This also defines another function of the support struts, 40, or transverse end walls, as described above, which may thus act as part of the surface, or one wall of the radial feed channels 19. Preferably, there will be four such radially extending feed channels 19, disposed at approximately 90° with respect to each other, and forming spokes for the transmission of the heat-transfer medium from the central feed passage 6 outwardly towards the annular flow space 12 between the inner and outer concentric shells, 11 and 4.

Figure 4:
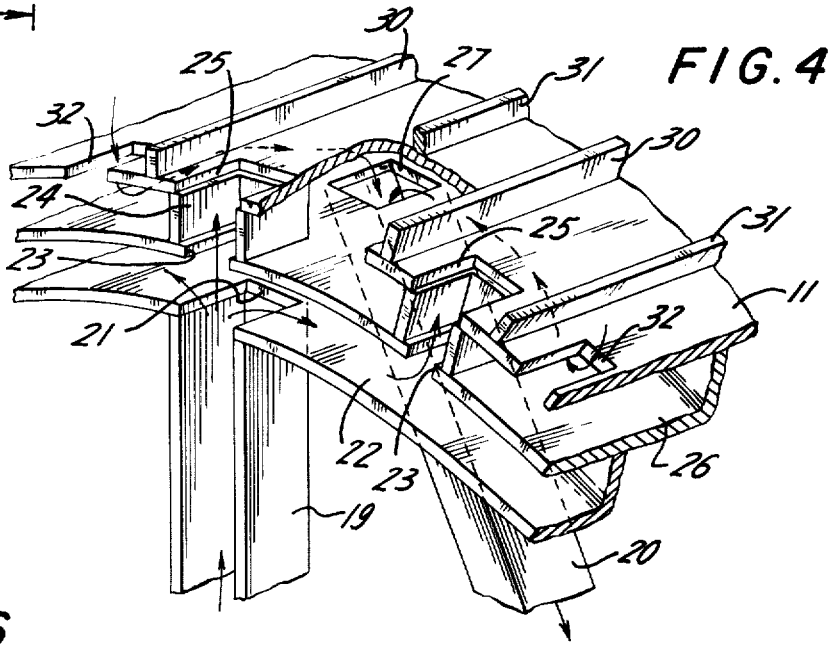
FIG. 4 is a disassembled, partial perspective view of the annular feed and return plenums and flow paths of the present invention.
Figure 6:
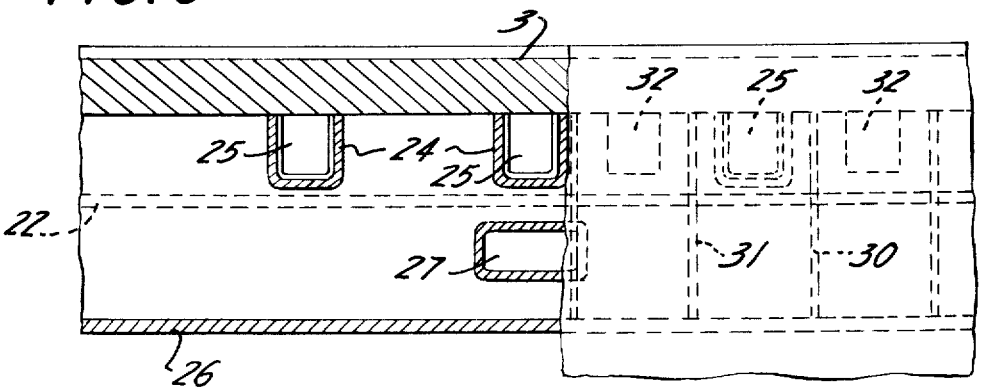
FIG. 6 is a partial sectional longitudinal view, taken along 6—6 of FIG. 2, showing the radial feed distributors and return orifices of the present invention.

Referring to FIG. 4, each radially extending feed channel 19 terminates at an annular feed plenum 22, which again may also be formed integrally with the support struts 40, or with the transverse feed wall, the radial feed channels 19 being connected to the annular feed plenum 22 through openings 21 through the inner face of the annular feed plenum 22. Between the annular feed plenum 22 and the concentric inner shell 11 is an annular return plenum 26. To provide for the flow of fresh, hot oil from the annular feed plenum 22 to the annular flow space 12 between the inner and outer shells 11 and 14, respectively, there are provided radial feed distributors 24. These radial feed distributors 24 are substantially U-shaped channels passing through the annular return plenum 26, and connected to the annular feed plenum 22 through openings 23, and to the concentric inner shell 11 through entrance apertures 25. There is therefore no contact or leakage between fresh hot feed oil passing through these radial feed distributors 24, and oil within the annular return plenum 26, which, as discussed below, has already been used to heat the outer shell 4, and has cooled somewhat, prior to return and removal.

Preferably, these entrance apertures will be formed in a circular path along the surface of the inner shell 11, at or near its end closest to the feed face 3.

Figure 5:
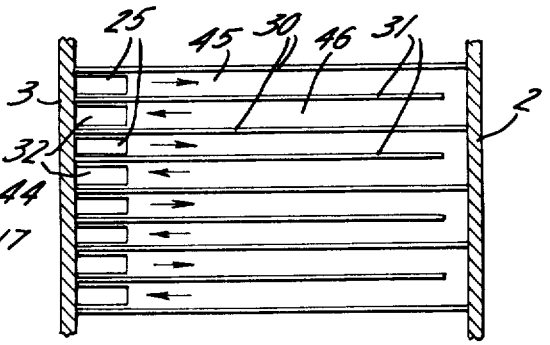
FIG. 5 is a development view of the approximately U-shaped flow paths of the present invention.

Thus, referring to FIG. 5, the entrance aperture 25 in each radial feed distributor, 24, permits the passage of heat transfer media into the annular flow space 12 between the inner and outer shells 11 and 14, respectively. The annular flow space 12 is divided into longitudinal arcuate compartments by partitions 30 which extend from the annular plates 38 and 39 at both ends of the drum, and also communicate with both the inner and outer shells, 11 and 4. One such entrance aperture 25, between the radial feed distributor 24 and the inner shell 11, is thus provided for passage of heat-transfer media into each such longitudinally extending compartment formed by two adjacent longitudinal partitions 30. Between each such pair of longitudinal partitions 30 is provided a longitudinally extending baffle 31, which extends between the inner and outer shells, 11 and 4, but only for a portion of the length of the longitudinally extending compartments, and preferably terminating a short distance from the end face 2. These baffles 31 also communicate with the inner and outer shells 11 and 4, respectively, as do the longitudinal partitions 30. Substantially U-shaped flow paths are thus provided within each longitudinally extending compartment thus permitting the flow of hot heat-transfer fluid therethrough as shown by the arrows in FIG. 5. Each such substantially U-shaped flow path will thus include an entrance leg 45 and an exit leg 46, the entrance leg 45 of each such flow path being connected to the radial feed distributor 24 through entrance aperture 25, while the exit leg 46 of each such flow path is connected to the annular return plenum 26, through exit aperture 32. Thus, the entrance and exit apertures, 25 and 32, will alternate in a circular path along the surface of inner shell 11, again preferably at or near the feed face 3 of the drum 1.

Figure 2:
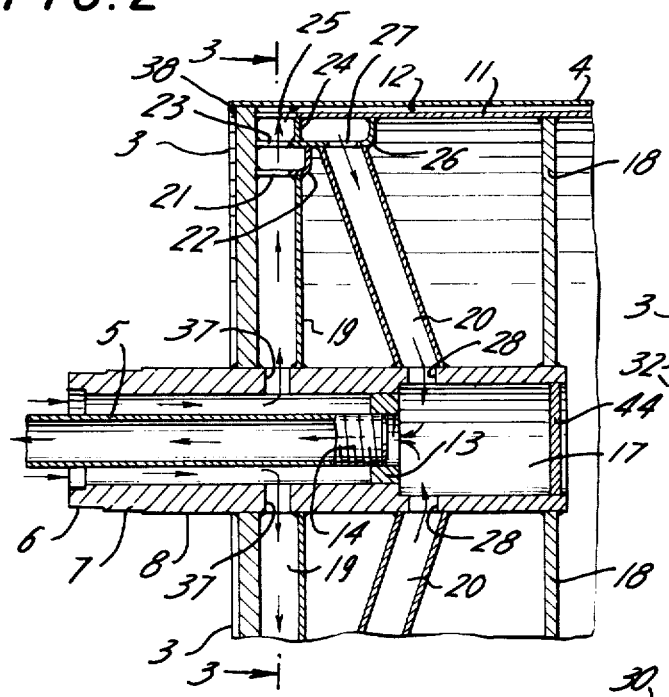
FIG. 2 is a partial sectional longitudinal view of the feed wall end of the present apparatus, including feed and return means.

As can best be seen from FIG. 2, the annular return plenum 26 is of a shape substantially the same as the annular feed plenum 22, but is of a size extending longitudinally from the feed face 3 a greater distance than does the annular feed plenum 22. There may thus be provided in the annular return plenum 26 a return orifice 27, formed through the wall of the annular return plenum at a point along that leg of the return plenum extending longitudinally from the feed face 3, but past the point where the transverse leg or wall of the annular feed plenum 22 terminates. The return orifice 27 connects the annular return plenum 26 to the central feed passage 6 through radially extending return channels 20, which themselves are connected to the central feed passage 6 through radial return openings 28. Preferably, there will be four approximately radially extending return channels 20, again forming spokes radiating from the central feed conduit 6, and they will be disposed at approximately 90° with respect to each other. Angular disposition of these return channels 20 is preferred in order to assure that each such approximately radially extending return channel 20 is connected to the central feed passage 6 at a point substantially downstream from the radial feed openings 37 which connect with the radially extending feed channels 19. Within the central feed passage 6, and between the radial feed openings 37 and the radial return openings 28, there is provided a threaded annular spacer 13, provided with threads 14. Thus, a return pipe 5, having mating threads at its end, may be inserted into the threads 14 of the threaded annular spaces 13, so as to form a central coaxial return passage for heat-transfer media being withdrawn from the drum, through the return pipe 5. When this embodiment is employed, the central feed passage 6 will terminate at a bulkhead 44 fitted so as to seal the end of the central feed passage 6, and prevent the flow or leakage of any heat-transfer fluid therefrom. Alternatively, the return pipe 5 can be removed, and replaced with a solid stop cap, also having threads to mate with the threads 14 of the threaded annular spacer 13, so as to completely seal off the central feed passage 6 at that point. In this embodiment, the bulkhead 44 is thus eliminated, and the central feed passage 6 will extend co-axially through the entire drum, connecting with the support roller 9, which is, this embodiment, a similar hollow pipe coextensive with the central feed passage 6. Thus, the used heat-transfer medium, in this embodiment, will be withdrawn through the support roller 9, from the opposite end of the drum from which it entered, instead of through the return pipe 5.

Thus, when the return pipe 5 is employed, along with the bulkhead 44, all heat-transfer media flowing into the annular space between the return pipe 5 and the central feed passage 6, will flow outwardly through the radial openings 37. Similarly, the heat-transfer medium, upon return, will again enter the central feed passage 6 at a point 17 downstream therefrom, upon passing through the radial return openings 28, and will then be withdrawn through return pipe 5. The drum is also provided with spaced radially extending struts 18 formed as spokes radiating from the central feed passage 6, and preferably of a shape similar to that of the struts 40 at the end faces, as previously described, and extending outwardly to the inner shell 11, in order to provide additional support for the inner and outer shells of the drum, and to further withstand external pressure exerted thereon. Also, in the preferred embodiment where the central feed passage 6 terminates at the bulkhead 44, the remainder of the drum will include additional support struts, similar to those struts 18 extending from the central feed passage 6, but here these struts will extend completely between the inner shells 11, diametrically through the axis of the drum.

Referring again to FIG. 1, heat-transfer media entering the drum through the annular space between central feed passage 6 and return pipe 5 will flow through the annular flow space 12 formed between the inner and outer shells, 11 and 4, respectively, in a manner so as to achieve substantially uniform heating of the external or outer shell 4. The fresh, hot, heat-transfer medium, such as hot oil, will thus pass through the annular space formed in the central, co-axial feed passage 6 by the return pipe 5, and enter the drum 1. The central feed passage 6 is supported by bearings 7 and 8, and the heat-transfer medium thus passes through the feed face. The feed face includes annular plates 28 and 29, forming the opposite ends of the inner and outer shells, 11 and 4, and support struts 40, extending from central feed passage 6 to the inner shell 11 or alternatively, a solid transverse feed wall. All of this fresh, hot oil will then pass through four radial feed openings 37 extending through the central feed passage 6. The presence of the threaded annular spacer 13, attached to the return pipe 5, will thus prevent further longitudinal flow through the central feed passage 6. The fresh, hot oil will then flow outwardly through radially extending feed channels 19, and then through openings 21 into annular feed plenum 22. The fresh heat-transfer medium passing through openings 21 may thus be distributed to each substantially U-shaped flow path in the annular flow space 12 formed between inner and outer shells 11 and 4, respectively, by passing through openings 23, radial feed distributors 24, and entrance apertures 25 into the annular flow space 12, between the concentric inner and outer shells, at a temperature as near to that of the oil which initially passed into the drum through central feed passge 6 as is possible without reheating. The hot oil thus passing through each entrance aperture 25 will then travel through a substantially U-shaped flow path between the inner and outer shells, and formed by longitudinally extending partitions 30 and baffles 31. After traveling through such a flow path from the feed face 3 along the periphery of the drum along entrance leg 45 to the return face 2, around the baffle 31, and similarly along return leg 46, back to the feed face 3, the oil will then pass through exit aperture 32. The oil entering each substantially U-shaped flow path through successive entrance apertures 25 will thus be fresh, hot oil, and no oil will travel through more than one such substantially U-shaped flow path prior to returning through exit apertures 32, for withdrawal or return.

The return of the heat transfer media will then be accomplished by its flow through exit apertures 32 into the annular return plenum 26. The oil in the annular return plenum, while still relatively hot, will be cooler than the fresh, hot oil passing through the radial feed distributors 24, which extend through the annular return plenum 26. The cooling of the fresh, hot oil is thus kept to an absolute minimum, only a small degree of heat transfer occurring through the walls of these relatively short radial feed distributors 24. The heat-transfer medium then passes through openings 27 into each angularly radially extending return channel 20, and through radial return openings 28, into central feed passage 6, at a point 17 downstream, with respect to the feed face 3, from the threaded annular spacer 13. The heat-transfer medium or hot oil, now somewhat cooled will then flow through return pipe 5, prevented from further flow longitudinally through the drum by the presence of bulkhead 44, for withdrawal from the drum, to be either discarded, used for other purposes, or re heated and recirculated through the drum.

Alternatively, in the embodiment where the return pipe 5 is removed and replaced with a solid threaded stop which mates with the threads 14 in the threaded annular spacer 13, so as to seal the central feed passage 6 at that point, and the bulkhead 44 is also eliminated, while the central feed passage 6 now extends longitudinally through the drum, to join with the support roller 9, which is now hollow, so as to permit the withdrawal of used heat-transfer media therefrom, the heat-transfer media reentering the central feed passage 6 through radial return openings 28 will now flow longitudinally along the central axis of the drum, through the remainder of the central feed passage 6, and finally through support roller 9 in return face 2, again to be similarly either discarded, used for other purposes, or reheated and recirculated.

The invention may be embodied in other specific forms without departing from the spirit or essential characteristics thereof. The present embodiments are therefore to be considered in all respects as illustrative and not restrictive, the scope or the invention being indicated by the appended claims rather than by the foregoing description, and all changes which come within the meaning and range of equivalency of the claims are therefore intended to be embraced therein.

What I claimed is:

[1. Apparatus for uniformly heating materials, said apparatus comprising:

(a) concentric inner and outer shells defining an annular flow space therebetween;

(b) closing means connecting the opposite ends of said inner and outer shells;

(c) longitudinally extending partitions extending between said inner and outer shells and forming a plurality of longitudinally extending compartments within said flow space;

(d) longitudinally extending baffles extending between said inner and outer shells for a portion of the length of said compartments, so that an approximately U-shaped flow path is formed within each of said compartments, said approximately U-shaped flow paths each including only two legs consisting of an entrance leg and an exit leg, said legs being circumferentially arranged with respect to each other;

(e) feed means for supplying a heat-transfer fluid to said entrance leg of each of said approximately U-shaped flow paths;

(f) return means for withdrawing a heat-transfer fluid from said exit leg of each of said approximately U-shaped flow paths.]

[2. The apparatus of claim 1 including a centrally disposed concentric feed passage adapted to be connected to a source of heat-transfer fluid, said central feed passage communicating with said feed means and said return means.]

[3. The apparatus of claim 2 including dividing means within said central feed passage, for separating said feed means from said return means.]

[4. The apparatus of claim 2 including support struts extending from said central feed passage to said closing means.]

[5. The apparatus of claim 2 wherein said closing means comprises transverse end walls.]

[6. The apparatus of claim 5 wherein said transverse end walls extend from said central feed passage to said outer shell.]

7. [The apparatus of claim 2 wherein said return means includes:] *Apparatus for uniformly heating materials, said apparatus comprising:*

*(a) concentric inner and outer shells defining an annular flow space therebetween;*

*(b) closing means connecting the opposite ends of said inner and outer shells;*

*(c) longitudinally extending partitions extending between said inner and outer shells and forming a plurality of longitudinally extending compartments within said flow space;*

*(d) longitudinally extending baffles extending between said inner and outer shells for a portion of the length of said compartments, so that an approximately U-shaped flow path is formed within said compartments, said approximately U-shaped flow paths including an entrance leg and an exit leg;*

*(e) feed means for supplying a heat-transfer fluid to said entrance leg of each of said approximately U-shaped flow paths;*

*(f) return means for withdrawing a heat-transfer fluid from said exit leg of each of said approximately U-shaped flow paths;*

*(g) a centrally disposed concentric feed passage adapted to be connected to a source of heat-transfer fluid, said central feed passage communicating with said feed means and said return means;*

*(h) said return means including:*

[(a)] an annular return plenum [disposed beneath] *extending about the inner circumference of* said inner shell and communicating with said exit legs of said approximately U-shaped flow paths; and

[(b)] at least one radially extending return channel communicating with said central feed passage and with said annular return plenum for removing heat-transfer fluid from said annular return plenum.

8. The apparatus of claim 7 wherein said annular return plenum communicates with said exit legs by means of exit apertures in said inner shell.

9. The apparatus of claim 8 including a plurality of said exit apertures disposed in a circular path along the surface of said inner shell.

10. The apparatus of claim 7 including at least one return orifice communicating with said radially extending return channel and with said annular return plenum, for removing heat-transfer fluid from said annular return plenum.

11. The apparatus of claim 7 including a plurality of said radially extending return channels.

12. The apparatus of claim 11 wherein said radially extending return channels are disposed at approximately 90° with respect to each other.

[13. The apparatus of claim 6 wherein said return means includes:

(a) an annular return plenum disposed beneath said inner shell and communicating with said exit legs of said approximately U-shaped flow paths; and (b) at least one radially extending return channel communicating with said central feed passage and with said annular return plenum for removing heat-transfer fluid from said annular return plenum.]

14. The apparatus of claim [2] *7* wherein said feed means includes:

(a) an annular feed plenum disposed beneath said inner shell and communicating with said entrance legs of said approximately U-shaped flow paths; and (b) at least one radially extending feed channel communicating with said central feed passage and with said annular feed plenum, for supplying heat-transfer fluid to said annular feed plenum.

15. The apparatus of claim 14 including a plurality of radial feed distributors connecting said annular feed plenum to said entrance legs of each of said approximately U-shaped flow paths.

16. The apparatus of claim 15 wherein said radial feed distributors communicate with said entrance legs by means of entrance apertures in said inner shells.

17. The apparatus of claim 16 including a plurality of said entrance apertures disposed in a circular path along the surface of said inner shell.

18. The apparatus of claim 14 including a plurality of said radially extending feed channels.

19. The apparatus of claim 18 wherein said radially extending feed channels are disposed at approximately 90° with respect to each other.

20. The apparatus of claim 14 wherein said closing means comprises transverse end walls.

21. The apparatus of claim 20 wherein said transverse end walls extend from said central feed passage to said outer shell.

22. The apparatus of claim 14 including dividing means within said central feed passage, for separating said feed means from said return means.

23. The apparatus of claim 14 including support struts extending from said central feed passage to said closing means.

[24. The apparatus of claim 7 wherein said feed means includes:

(a) an annular feed plenum disposed beneath said inner shell and communicating with said entrance legs of said approximately U-shaped flow paths; and (b) at least one radially extending feed channel communicating with said central feed passage and with said annular feed plenum, for supplying heat-transfer fluid to said annular feed plenum.]

25. The apparatus of claim [24] *14* wherein said annular return plenum is disposed between said annular feed plenum and said inner shell.

26. The apparatus of claim 25 including a plurality of radial feed distributors connecting said annular feed plenum to said entrance legs of each of said approximately U-shaped flow paths, said radial feed distributors passing through said annular return plenum.

27. The apparatus of claim 26 wherein said radial feed distributors communicate with said entrance legs by means of entrance apertures in said inner shell, and said annular return plenum communicates with said exit legs by means of exit apertures in said inner shell.

28. The apparatus of claim 27 including a plurality of alternating entrance apertures and exit apertures, disposed in a circular path along the surface of said inner shell.

29. The apparatus of claim [24] *14* including a plurality of said radially extending feed channels, and a plurality of said radially extending return channels.

30. The apparatus of claim 29 wherein said radially extending feed channels are disposed at approximately 90° with respect to each other, and wherein said radially extending return channels are disposed at approximately 90° with respect to each other.

31. The apparatus of claim [24] *7* including dividing means within said central feed passage, for separating said feed means from said return means.

32. The apparatus of claim [24] *7* including support struts extending from said central feed passage to said closing means.

33. Apparatus for uniformly heating materials, said apparatus comprising:

(a) concentric inner and outer shells defining an annular flow space therebetween;

(b) closing means communicating with said inner and outer shells;

(c) barrier means positioned within said annular flow space for establishing a plurality of flow paths having entrance and exit legs;

(d) feed means for supplying a heat-transfer fluid to said entrance legs;

(e) return means for withdrawing a heat-transfer fluid from said exit legs;

(f) a centrally disposed concentric feed passage adapted to be connnected to a source of heat-transfer fluid, said central feed passage communicating with said feed means and said return means;

(g) said feed means includes an annular feed plenum disposed beneath said inner shell and communicating with said entrance legs, and at least one radially extending feed channel communicating with said central feed passage and with said annular feed plenum, for supplying heat-transfer fluid to said annular feed plenum; and (h) said return means includes an annular return plenum disposed beneath said inner shell and communicating with said exit legs, and at least one radially extending return channel communicating with said central feed passage and with said annular return plenum, for removing heat-transfer fluid from said annular return plenum.

34. The apparatus of claim 33 wherein said closing means comprises end walls extending from said central feed passage to said outer shell.

35. The apparatus of claim 33 wherein said annular return plenum is disposed between said annular feed plenum and said inner shell.

36. The apparatus of claim 33 including a plurality of said radially extending feed channels.

37. The apparatus of claim 33 including a plurality of said radially extending return channels.

38. The apparatus of claim 33 including at least one return orifice communicating with said radially extending return channel and with said annular return plenum, for removing heat-transfer fluid from said annular return plenum.

39. The apparatus of claim 33 including a plurality of radial feed distributors communicating with said entrance legs and with said annular feed plenum, for supplying heat-transfer fluid to said entrance legs.

40. The apparatus of claim 33 wherein said annular return plenum communicates with said exit legs by means of exit apertures in said inner shell.

41. The apparatus of claim 39 wherein said radial feed distributors communicate with said entrance legs by means of entrance apertures in said inner shell.

* * * * *